_(12)_ United States Patent
Lawrence et al.

(10) Patent No.: US 11,012,531 B2
(45) Date of Patent: May 18, 2021

(54) SYSTEMS AND METHODS FOR CULLING REQUESTS FOR HIERARCHICAL LEVEL OF DETAIL CONTENT OVER A COMMUNICATIONS NETWORK

(71) Applicant: Cesium GS, Inc., Exton, PA (US)

(72) Inventors: Joshua Lawrence, Media, PA (US); Omar Shehata, Philadelphia, PA (US); Sean Lilley, Philadelphia, PA (US); Patrick Cozzi, Drexel Hill, PA (US)

(73) Assignee: Cesium GS, Inc., Philadelphia, PA (US)

( * ) Notice: Subject to any disclaimer, the term of this patent is extended or adjusted under 35 U.S.C. 154(b) by 0 days.

(21) Appl. No.: 16/850,266

(22) Filed: Apr. 16, 2020

(65) Prior Publication Data

US 2020/0344319 A1 Oct. 29, 2020

Related U.S. Application Data

(60) Provisional application No. 62/837,381, filed on Apr. 23, 2019.

(51) Int. Cl.
*H04L 29/08* (2006.01)
*G06T 15/00* (2011.01)
*G06T 7/70* (2017.01)
*G06T 7/20* (2017.01)

(52) U.S. Cl.
CPC ............... *H04L 67/32* (2013.01); *G06T 7/20* (2013.01); *G06T 7/70* (2017.01); *G06T 15/005* (2013.01); *G06T 2210/36* (2013.01)

(58) Field of Classification Search
None
See application file for complete search history.

(56) References Cited

U.S. PATENT DOCUMENTS

| | | | |
|---|---|---|---|
| 8,970,583 B1* | 3/2015 | Overbeck | G06T 17/05 345/419 |
| 10,497,173 B2* | 12/2019 | Fuetterling | G06T 7/20 |
| 2005/0086318 A1* | 4/2005 | Aubault | H04L 67/38 709/213 |
| 2013/0321399 A1* | 12/2013 | Rohlf | G06T 17/05 345/419 |
| 2013/0342537 A1* | 12/2013 | Vorhies | G06T 19/003 345/428 |
| 2015/0178976 A1* | 6/2015 | Strauss | G06T 15/08 345/427 |
| 2015/0178986 A1* | 6/2015 | Schpok | G06T 17/05 345/420 |
| 2015/0373153 A1* | 12/2015 | Jenkins | H04L 45/08 709/203 |
| 2017/0091992 A1* | 3/2017 | Rogers | G06T 17/005 |
| 2019/0206114 A1* | 7/2019 | Baldwin | G06T 15/005 |
| 2019/0340812 A1* | 11/2019 | Fuetterling | G06T 15/005 |
| 2020/0051290 A1* | 2/2020 | Yang | G06T 15/06 |

* cited by examiner

*Primary Examiner* — Ryan M Gray
(74) *Attorney, Agent, or Firm* — The Marbury Law Group, PLLC

(57) ABSTRACT

Systems, methods, devices, and non-transitory media of various embodiments enable culling requests for hierarchical level of detail (HLOD) content over a communications network. Various embodiment methods may reduce a number of requests associated with dynamic camera movement, compared to number of requests generated in current methods.

26 Claims, 11 Drawing Sheets

SYSTEMS AND METHODS FOR CULLING REQUESTS FOR HIERARCHICAL LEVEL OF DETAIL CONTENT OVER A COMMUNICATIONS NETWORK

RELATED APPLICATIONS

This application claims priority to U.S. Provisional Application No. 62/837,381 filed on Apr. 23, 2019 entitled "Systems and Methods For Culling Requests For Hierarchical Level Of Detail Content Over A Communications Network," the entire contents of which are hereby incorporated by reference.

BACKGROUND

Computer graphics, and especially three-dimensional (also referred to simply as "3D" herein) visualization, is a rapidly developing computing technology finding new applications in many different industries, including geospatial, defense, and entertainment.

One challenge faced in three-dimensional visualization is the complicated nature of three-dimensional objects. Three-dimensional objects generally are formed from a geometry, often a set of triangles (i.e., a triangle mesh), and textures, often a set of two-dimensional images. A higher quality three-dimensional object often includes large amounts of data that can be spread out over many file locations. As such, high quality three-dimensional objects can be difficult to render in a computing device display. Additionally, high quality three-dimensional objects may not be needed in every visualization. For example, when a camera view point for a three-dimensional model is zoomed out sufficiently, a low-quality three-dimensional object may be suitable for rendering. Accordingly, in three-dimensional visualization it can be beneficial to create multiple versions of a three-dimensional object, such as a high-quality version and a low-quality version.

SUMMARY

The systems, methods, devices, and non-transitory media of the various embodiments enable culling requests for hierarchical level of detail content (HLOD) over a communications network. Various embodiment methods may reduce the number of requests associated with dynamic camera movement, compared to the number of requests generated in current methods.

Various embodiments may include methods which may be performed by a computing device for culling requests for data for nodes within an HLOD data structure while rendering images. Various embodiments may include determining whether a camera is moving during a frame associated with a traversal of an HLOD data structure, determining whether any nodes associated with the traversal of the HLOD data structure are not valuable for rendering the frame in response to determining that the camera is moving, and delaying requests for any nodes associated with the traversal of the HLOD data structure that are not valuable for rendering the frame. Some embodiments may further include sending requests for any nodes associated with the traversal of the HLOD data structure that are valuable over a network to a server. In some embodiments, determining whether any nodes associated with the traversal of the HLOD data structure are not valuable for rendering the frame in response to determining that the camera is moving may include determining whether a camera idle timer is below a threshold, and indicating any nodes associated with the traversal of the HLOD data structure located within a distance of an edge of the screen as not valuable for rendering the frame in response to determining the camera idle timer is below the threshold. In some embodiments, determining whether any nodes associated with the traversal of the HLOD data structure are not valuable for rendering the frame in response to determining that the camera is moving may include determining a camera movement magnitude from a last frame to a current camera position, comparing bounding volume sizes for any nodes associated with the traversal of the HLOD data structure to the camera movement magnitude, and indicating any nodes associated with the traversal of the HLOD data structure having a bounding volume size smaller than the camera movement magnitude as not valuable for rendering the frame. In some embodiments, the bounding volume sizes are scaled based at least in part on a dot product of a movement direction of the camera and a direction to the node center from the camera position. In some embodiments, the camera movement magnitude is scaled based at least in part on a network latency factor. In some embodiments, determining whether any nodes associated with the traversal of the HLOD data structure are not valuable for rendering the frame in response to determining that the camera is moving may include selecting a temporary resolution, wherein the temporary resolution is lower than a resolution used when the camera is not moving, and indicating any nodes associated with the traversal of the HLOD data structure having a resolution above the temporary resolution as not valuable for rendering the frame. In some embodiments, the temporary resolution may be selected based at least in part on a camera movement velocity. In some embodiments, determining whether the camera is moving may include determining whether a camera movement velocity is a non-zero value. Some embodiments may further include determining whether the camera has stopped moving, and sending the requests for any nodes associated with the traversal of the HLOD data structure that are not valuable for rendering the frame over the network to the server in response to determining that the camera has stopped moving. Some embodiments may further include determining whether a request that has not yet been sent to the server is associated with a node no longer in view of the camera, and canceling the request that has not yet been sent to the server in response to determining the request is associated with a node no longer in view of the camera.

Various aspects include a device including a processor configured with processor-executable instructions to perform operations of any of the methods summarized above. Various aspects also include a non-transitory processor-readable medium on which is stored processor-executable instructions configured to cause a processor of a device to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
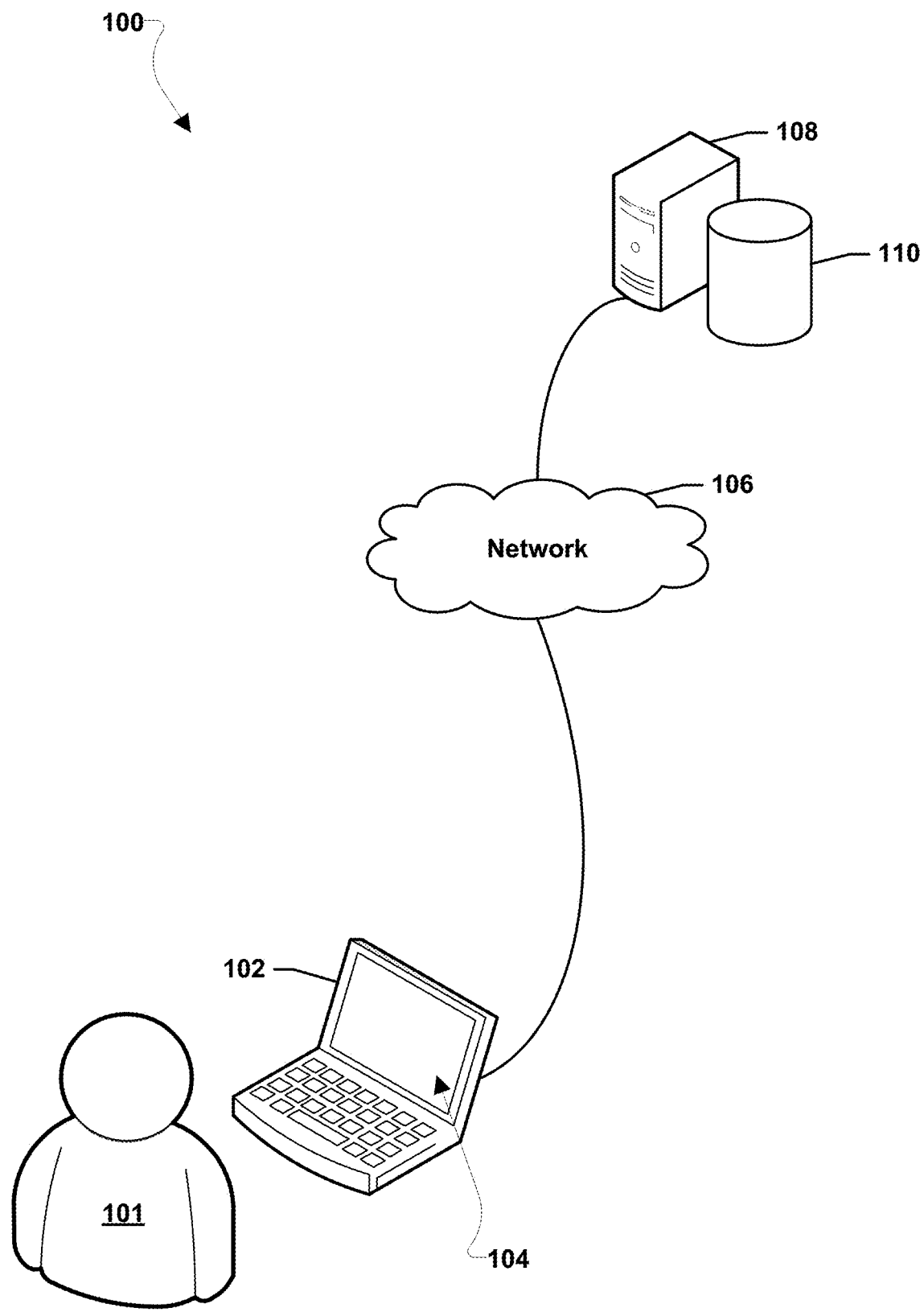
FIG. 1 is a block diagram of an example system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "computing device" as used herein refers to any one or all of cellular telephones, smartphones, personal or mobile multi-media players, personal data assistants (PDA's), laptop computers, personal computers, servers, tablet computers, smartbooks, ultrabooks, palm-top computers, multimedia Internet enabled cellular telephones, and similar electronic devices that include a memory and a programmable processor. While specific examples are listed above, the various embodiments are generally useful in any electronic device that includes a processor and executes application programs.

Textures are often used in computer graphics to increase the detail of information on the surface of triangle meshes. Surface information may include base color, static light color/intensity, influence weight for deformation algorithms, and parameters for shading algorithms, such as bump mapping or subsurface scattering.

Massive 3D models, such as large indexed triangle meshes, can be difficult to render, especially when rendering requires streaming data for the massive 3D model over a network, due to the amount of data associated with the 3D objects in the massive 3D model.

Massive 3D models are often organized into hierarchical level of details (HLODs) data structures to greatly reduce the total amount of data that needs to be rendered at any given time as well as to reduce aliasing. An HLOD data structure may be organized in a data tree with nodes defining different levels of detail. The level of detail varies from low detail to high detail as the HLOD is traversed from the roots of the HLOD to the leaves of the HLOD. A node in an HLOD that represents a large 3D model may include data needed to render that portion of the model to which the node corresponds. is the HLOD data structure is useful because only a small portion of the data may need to be updated to replace what is no longer at high enough detail as more detail needs to be rendered for a given change in camera view, such as a change in camera view resulting from zooming in on the model.

The data inside HLOD nodes for a 3D model may include vertex data, texture data, or any other information that may be needed to render the portion of the model defined by a HLOD node. Nodes in the HLOD often have a limit on the size of their payload to prevent slow incremental loading in network streaming scenarios. This prevents users from having to wait too long for something to update when the update requires a download of data from a server. Even with these techniques and limits, streaming massive datasets over a network can still be quite slow from a user experience point-of-view.

Culling requests for data of nodes that will not be valuable for rendering a frame when the data for the nodes is finally downloaded from the server may greatly reduce the total content download for a viewing session in which the camera or viewing perspective is moving. Examples of situations in which node data will be of little or no value for rendering a frame once finally downloaded include nodes for scene portions that will no longer be on screen by the time the node data is downloaded, nodes for scene portions that will only be on screen for a short time as the camera (or viewing perspective) zooms past, etc. Culling requests for nodes that will not be valuable for rendering the frame when the data for the nodes is finally downloaded from the server (e.g., nodes no longer on screen, nodes only on screen for a short time as the camera zooms past, etc.) may have the added benefit of making room for data requests for nodes that don't have those qualities, effectively increasing the download priority for nodes that will be valuable for rendering the frame, thereby enabling rendering the dynamic scene faster than compared to the speed at which the scene would be rendered if data of all nodes were requested.

FIG. 1 is a block diagram of an example system 100 suitable for use with the various embodiments. The system 100 may include multiple devices, such as a server 108 and computing device 102 connected to a network 106.

Figure 2:
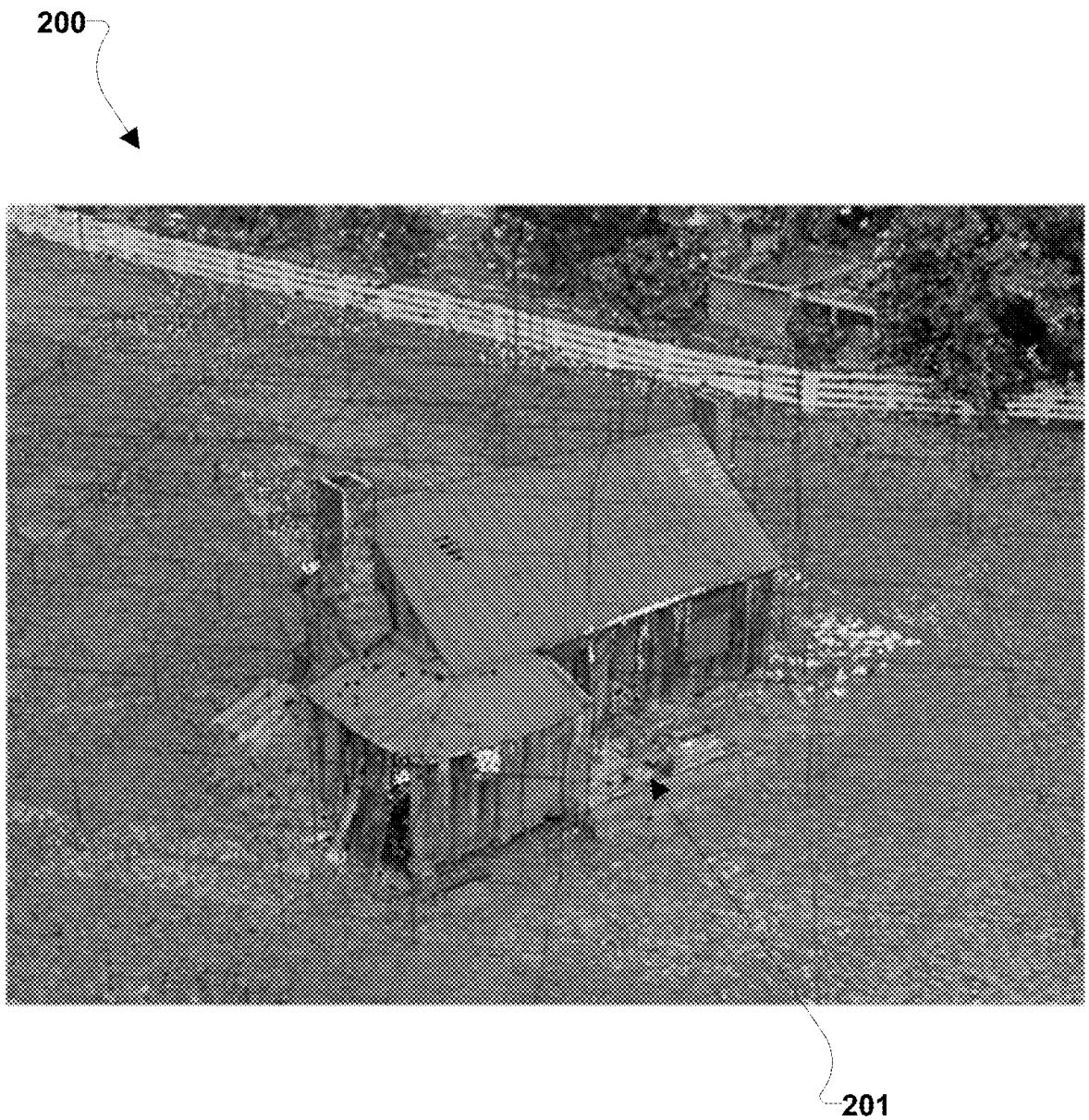
FIG. 2 illustrates a view of a 3D model data set showing bounding volumes of hierarchical level of detail (HLOD) nodes.

The server 108 may include a memory 110 storing data associated with one or more 3D models, such as data sets of 3D models, metadata describing the HLODs of 3D models, etc. The data associated with the one or more 3D models may be massive datasets. The massive 3D models stored in the memory 110 of the server 108 may be organized into HLODs. A node in an HLOD that represents a large 3D model may have or be linked to data needed to render the portion of the model for which the node corresponds. For example, FIG. 2 illustrates a view of a 3D model data set 200 showing bounding volumes of HLOD nodes, such as HLOD node 201. Returning to FIG. 1, the server 108 may be connected to a network 106, such as a Wide Area Network (WAN), a Local Area Network (LAN), and/or the Internet, and may exchange data via the connection to the network 106 with other computing devices connected to the network 106, such as computing device 102. The connections of the server 108 and/or computing device 102 to the network 106, may be wired and/or wireless connections.

The computing device 102 may request data associated with one or more 3D models from the server 108 via the network 106 and may receive data associated with the one or more 3D models from the server 108 via the network. Using the received data, the computing device 102 may render one or more portions of a 3D model on a screen 104 visible to a user 101 of the computing device 102.

Before any requests for data are made, a client-side view of the HLOD data structure may be configured at the computing device 102. A request for the metadata information of the HLOD is made by the computing device 102 to the hosting server 108. The server 108 may send the HLOD metadata to the computing device 102. The metadata information may be used by the computing device 102 to configure a client side understanding of the HLOD. This metadata sets up the node relationships in the HLOD tree, as well as the bounding volume of each node within the tree. The bounding volume information demarcates the spatial extents of the rendering assets (i.e., the data of the 3D models stored on the server 108) for which the node is responsible.

Figure 3:
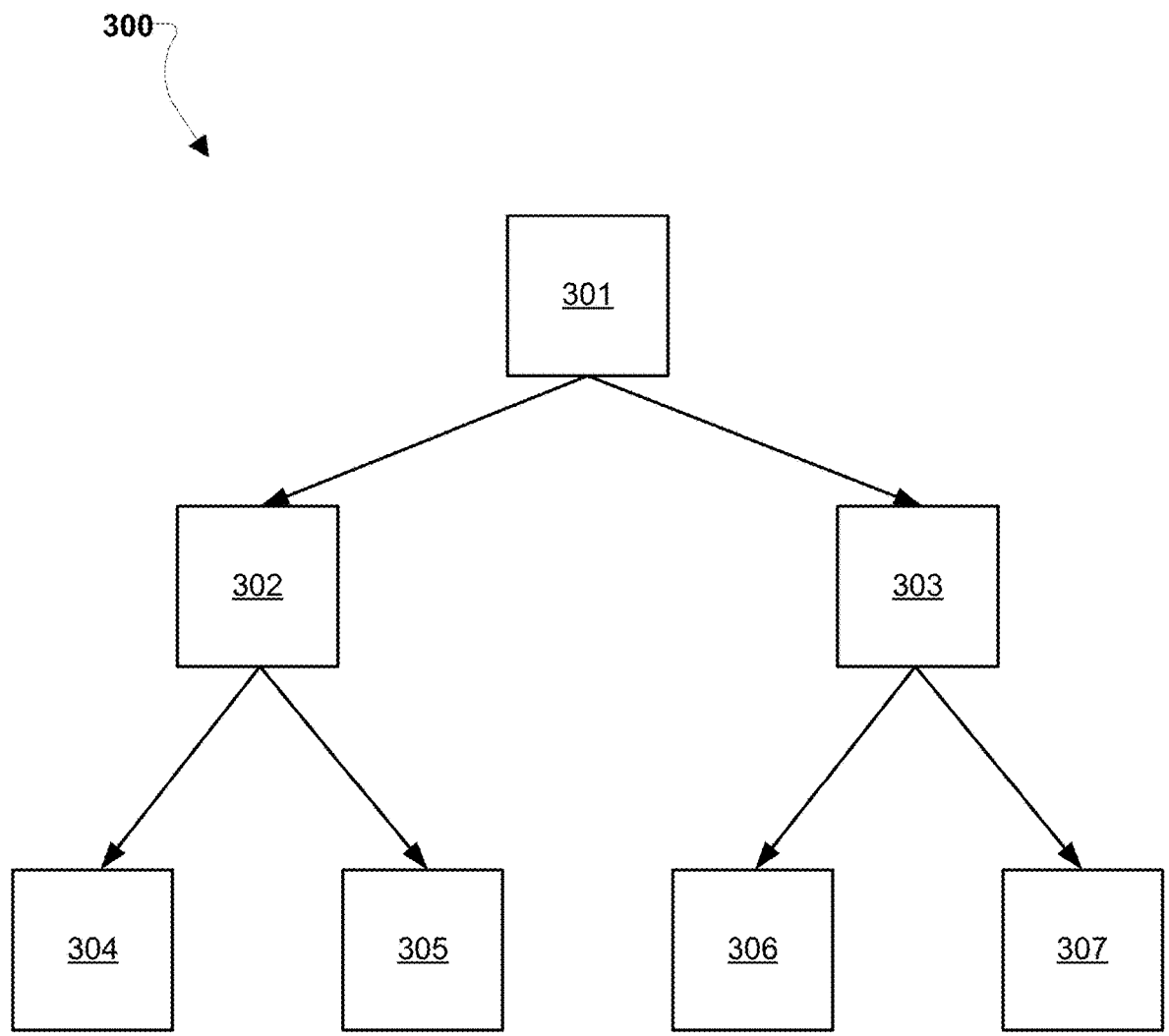
FIG. 3 illustrates a model of an example HLOD data structure suitable for use with various embodiments.

FIG. 3 illustrates a simple model of an example HLOD data structure 300 suitable for use with various embodiments. The HLOD data structure 300 may be generated by the computing device 102 based on HLOD metadata received from the server 108. The HLOD data structure 300 may be an HLOD tree structure including node bounds generated from the HLOD metadata. The HLOD may include nodes 301-307, and each node 301-307 may be associated with a bounding volume of a 3D model. The data associated with each node 301-307 may include vertex data, texture data, or any other information that may be needed to render the portion of the model defined by that respective node 301-307. A parent node, such as node 301, may include child nodes, such as nodes 302 and 303, that may also have their own respective child nodes, such as child nodes 304 and 305 for node 302 and child nodes 306 and 307 for node 303.

Figure 4:
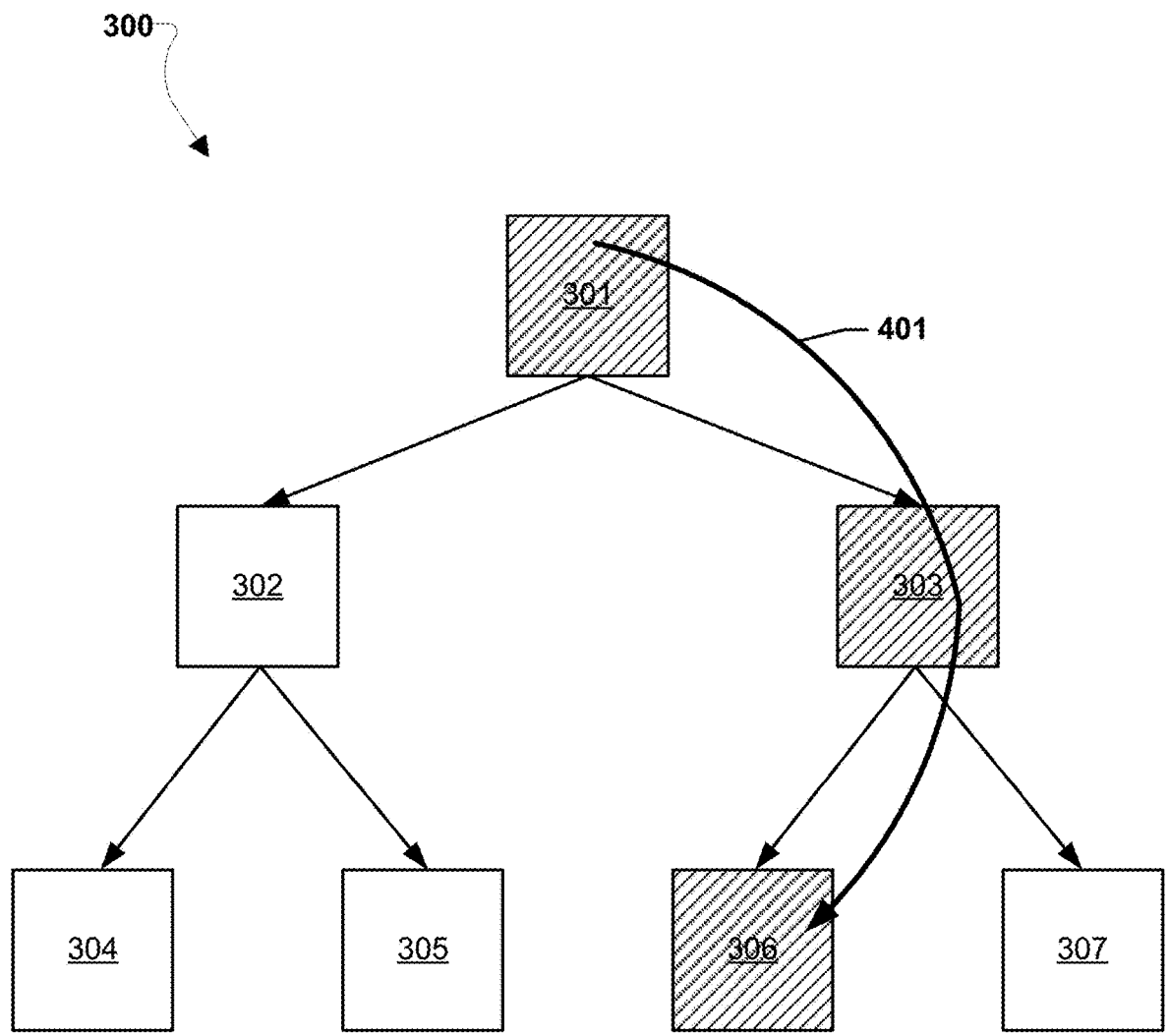
FIG. 4 illustrates an example traversal of the HLOD data structure of FIG. 3.

The computing device 102 may traverse the HLOD data structure 300 for each frame given a camera state (e.g., camera position, camera orientation, clipping planes, camera frustum, camera view direction, camera movement velocity, camera movement direction, idle time, etc.) to identify the nodes in the HLOD data structure 300 that include assets that need to be rendered to generate the view of the camera during that frame. For example, as illustrated in FIG. 4, a given traversal based on a camera state may identify nodes 301, 303, and 306 as including assets needed to render the view of the camera during a frame. Such a traversal 401 as illustrated in FIG. 4, may result in requests for data of nodes 301, 303, and 306 being generated by the computing device 102. These requests may be sent from the computing device 102 to the server 108, and the server 108 may respond to the requests by sending the data of nodes 301, 303, and 306 to the computing device 102. In response to receiving the data of nodes 301, 303, and 306, the computing device 102 may render the view of the camera on the screen 104 visible to the user 101. Different traversals may result in requests associated with different nodes being generated by the computing device 102. There may be many requests generated for many different HLODs in any given scene representing a camera view to be rendered on a screen 104. The number of requests generated for a given scene may cause the streaming of massive datasets from the server 108 to the computing device 102 over the network 106 to be quite slow from the user experience point-of-view of the user 101 the number of requests may exceed the bandwidth capacity of the connections between the server 108, network 106, and computing device 102. The number of requests may cause load times for the nodes of the HLOD 300 to be slow and may negatively impact the user experience.

Various embodiments may enable data requests for selected nodes to be canceled. In various embodiments, a data request associated with nodes corresponding to portions of a frame that will no longer be in view of a camera when the frame is rendered may be canceled. In various embodiments, a request may be delayed in response to the value for rendering the frame of the node associated with the request being determined to be low.

In various embodiments, camera idle time may be tracked. In response to the camera idle time being below a threshold, requests for nodes in less important parts of the camera view (e.g., toward the edge of a screen) may be held and not sent. The threshold may be an amount of time that may be associated with a user parking the camera at a certain view. In response to the camera idle time reaching or exceeding the threshold, any held and not sent requests may be sent.

In various embodiments, camera movement velocity may be used to delay requests for nodes corresponding to portions of a scene that may no longer be visible to the camera (and thus not included within a frame to be rendered) based on the camera's movement velocity. In various embodiments, the camera movement velocity, camera movement direction, and an average network latency may be used to determine whether the scene portion corresponding to a node is likely to be visible at the time the data for the node is returned in response to a request. Requests for node data of scene portions likely to be out of view of the camera at the time the node data is returned may be held and not sent (or canceled). Various embodiments may enable prediction of which potential node data requests may no longer be valuable for rendering a frame by the time the requested data comes back from the server considering how fast the camera is moving, its direction, and average network latency. Nodes corresponding to small tiles or triangles are generally nodes in the foreground of a scene for HLOD rendering where fine detail is needed for rendering a sharp image. These nodes may involve significant "request churn" as data requests of such nodes may be canceled a short while later because the corresponding portions of the scene are no longer in view of the camera or viewing perspective, or the amount of detail in such nodes is no longer needed due to some change in the camera view (e.g., zooming out which renders the initial close-up level of detail unnecessary). In contrast, nodes corresponding to large tiles are typically for scene portions in the background, and do not involve significant churn since it takes significant camera movement to move these tiles (and corresponding nodes) out of view. Various embodiments may scale with camera movement, so that when the camera is moving slower the methods will ignore fewer node data requests (perhaps not ignoring any nodes if the movement is slow enough) and when the camera is moving very fast the methods will ignore more requests.

In various embodiments, in response to determining that a camera is moving, a temporary resolution may be used in screen space error calculations than a resolution used when the camera is not moving. The temporary resolution may be lower than the resolution used when the camera is not moving. Requests associated with nodes having a screen space error greater than the temporary maximum screen space error may be held and not sent. In some embodiments, the temporary resolution may change based on the camera movement velocity.

Figure 5:
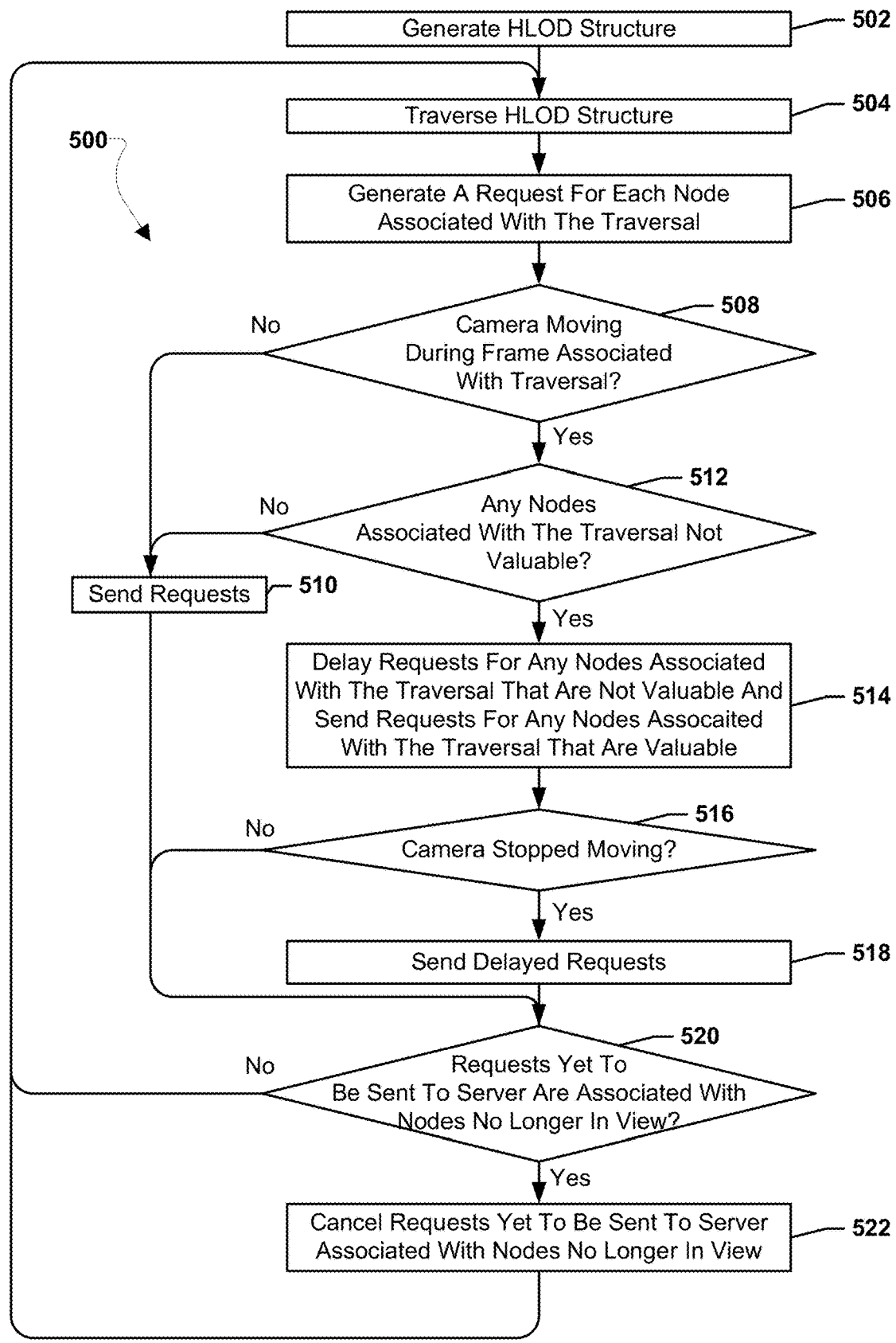
FIG. 5 is a process flow diagram illustrating an embodiment method for culling requests for nodes.

FIG. 5 illustrates an embodiment method 500 for culling requests for nodes. In various embodiments, the operations of method 500 may be performed by a component of a computing device (e.g., computing device 102), such as a central processing unit (CPU), graphics processing unit (GPU), etc.

In block 502, the computing device may generate an HLOD data structure. For example, a request for the metadata information of the HLOD may be made by the computing device (e.g., computing device 102) to the hosting server (e.g., server 108). The server may send the HLOD metadata to the computing device. The metadata information may be used by the computing device to configure a client side understanding of the HLOD. This metadata sets up the node relationships in the tree, as well as the bounding volume of each node. The bounding volume information demarcates the spatial extents of the rendering assets (i.e., the data of the 3D models stored on the host server) for which the node is responsible.

In block 504, the computing device may traverse the HLOD data structure. After the tree has been configured, a traversal of the tree may be executed every frame given some camera's state (e.g., camera position, camera orientation, clipping planes, camera frustum, camera view direction, camera movement velocity, camera movement direction, idle time, etc.). The camera state may be updated at the start of each traversal, such as on a per-frame basis. The traversal may identify any nodes that need assets from the host server (e.g., server 108) such that the nodes may be rendered for the given camera view. Such nodes including assets that are needed to render a given camera view may represent nodes associated with the traversal.

In block 506, the computing device may generate a request for each node associated with the traversal. The traversal may accumulate data requests for any nodes that need data from the server so that the nodes may be rendered for the given camera view associated with the traversal. In various embodiments, the requests may be messages, such as HyperText Transfer Protocol (HTTP) messages, requesting data from the server (e.g., server 108) to enable the node associated with the request to be rendered by the computing device (e.g., computing device 102) upon receipt of the node.

In determination block 508, the computing device may determine whether the camera was moving during the frame associated with the HLOD data structure traversal. In various embodiments, the camera state, such as the camera movement velocity, may indicate whether or not the camera is moving during the frame. For example, a camera movement velocity of zero may indicate the camera is stationary, and a camera movement velocity that is non-zero may indicate the camera is moving. As another example, a difference between a camera position in the current frame and a camera position in the previous frame may indicate the camera is moving.

In response to determining that the camera is not moving (i.e., determination block 508="No"), the computing device may send the node data requests to the server in block 510. Sending the node data requests may include moving the requests to a transmission queue for transmission to a server over a network, such as server 108.

In response to determining that the camera is moving (i.e., determination block 508="Yes"), the computing device may determine whether any nodes associated with the traversal are not valuable for rendering the frame in determination block 512. Valuable nodes may be nodes that need to be rendered to ensure the user experience is not degraded. Nodes that are not valuable for rendering the frame may be nodes that may not be rendered, or that may be rendered at a lower resolution, without impacting the user experience. For example, nodes that are not valuable for rendering the frame may be nodes father away from the center of the screen (e.g., nodes closer to a screen edge) as a user's eyes may focus more on the center of the screen during camera movement than the edges of the screen. Lower quality and/or non-rendered nodes toward the edges of the screen may not be perceived readily by a user and thus may not be valuable for rendering the frame. Various different methods may be used to determine whether nodes may or may not be valuable for rendering the frame, such as time gating and screen position methods, camera movement and node volume bounding methods, temporary resolution methods. Example methods for determining whether nodes may or may not be valuable for rendering the frame are discussed below with reference to FIGS. 7-9.

Figure 7:
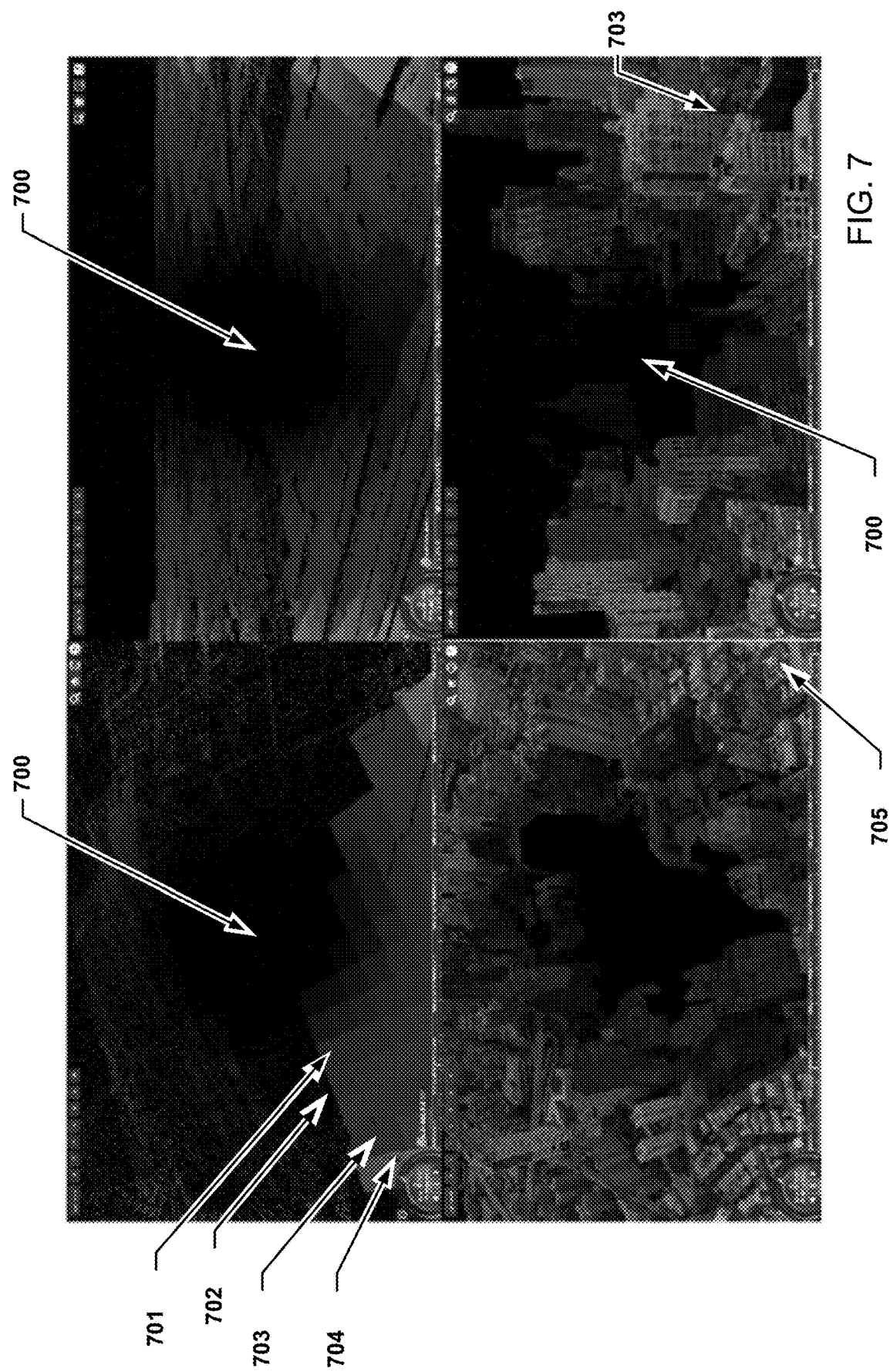
FIG. 7 illustrates heat maps of models of a city showing the edge distance differences in different scenes.

One method for determining whether any nodes associated with the traversal are not valuable for rendering the frame may be to time gate nodes. For example, the computing device may determine whether a camera idle timer is below a threshold in response to determining that the camera is moving. In various embodiments, a camera idle timer may be a count up type timer that is reset to zero in response to determining that a camera moved during that frame (e.g., in response to determination block 508="Yes"). In this manner, the camera idle timer may be a camera state that tracks how long the camera has been motionless. In various embodiments, the threshold may be any value, such as one second, two seconds, etc. In response to determining that the camera idle timer is below the threshold, the computing device may indicate any nodes associated with the traversal of the HLOD data structure within a distance of an edge of the screen as not valuable for rendering the frame. In this manner, using the camera idle timer, requests for nodes may be ignored if the nodes are positioned in less important parts of the screen. After the timer is above some threshold, these delayed requests may be sent since the user has parked the camera at a certain view. FIG. 7 illustrates heat maps of models of a city showing different nodes, shaded/color coded based on their distance from the edge of the screen. The upper row of heat maps are point clouds and the bottom row are two photogrammetry models of a city. The order of distance from the edge of the screen from farthest to closest are shown by the relative shading of the regions, with the darkest regions 700 being farthest, and the regions 701, the regions 702, the regions 703, the regions 704, and the regions 705 being successively lighter shaded in each heat map. As an example, the regions 705 and the regions 704, i.e., the lightest shaded regions, may be nodes in the images that may be ignored while the camera is moving and/or the camera idle timer is below a threshold, as these regions 704 and 705 may be closest to the edge of the screen. The color/shading selection in FIG. 7 arbitrary and merely applied as an example distinction between regions 700, 701, 702, 703, 704, and 705, as it is the relative distance from the edge of the screen from farthest to closest that distinguishes the nodes in the regions 700, 701, 702, 703, 704, and 705, not any selected color/shading.

Another method for determining whether any nodes associated with the traversal are not valuable for rendering the frame may be to cull nodes based on camera movement. For example, the computing device may determine a camera movement magnitude from a previous frame to the camera position of a current frame. The camera movement magnitude may be the difference between the camera positions in the previous frame and the current frame. The computing device may compare the camera movement magnitude to the bounding volume sizes for any nodes associated with the traversal of the HLOD data structure. Any nodes associated with the traversal of the HLOD data structure having a bounding volume size smaller than the camera movement magnitude may be indicated as not valuable for rendering the frame. In some embodiments, a multiplier may be used to increase or decrease the camera movement magnitude and thereby tune the desired behavior (e.g., loading more nodes or less nodes).

Figure 8:
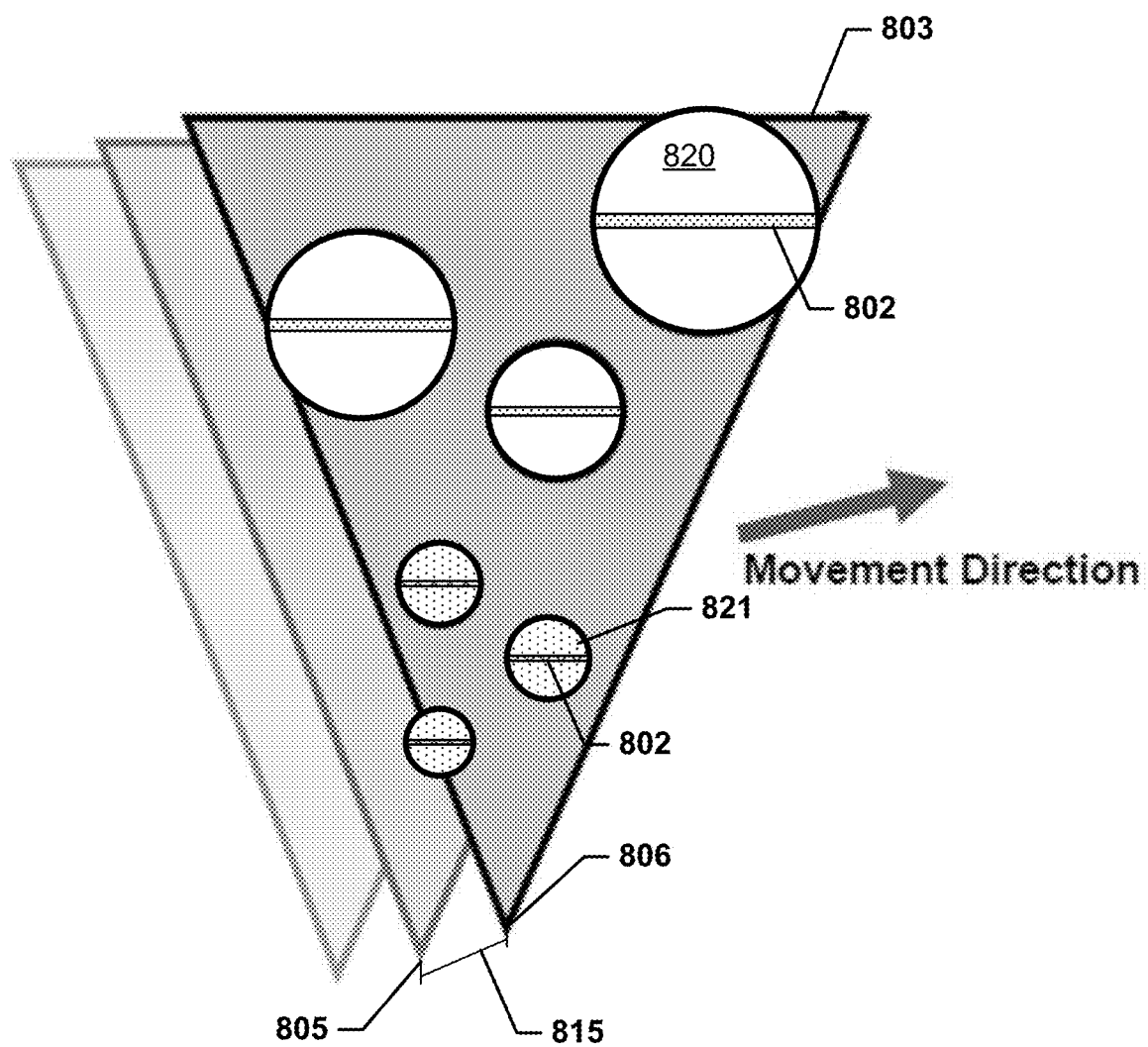
FIG. 8 illustrates an example of operations to identify requests for culling based on camera movement.

FIG. 8 illustrates an example of such culling based on camera movement. The camera movement magnitude 815 may be the distance between the camera position 805 of the previous frame and the camera position 806 of the current frame. The nodes in the frustum of the camera 803 may have bounding volume sizes 802, such as the diameter of the bounding volumes. The nodes with bounding volume sizes 802 smaller than the camera movement magnitude 815 may be indicated as not valuable for rendering the frame. For example, node 821 with a bounding volume size 802 smaller than the camera movement magnitude 815 may be indicated as not valuable for rendering the frame and as a result its node data request may be delayed. The nodes with bounding volume sizes 802 larger than the camera movement magnitude 815 may be indicated as valuable for rendering the frame. For example, node 820 with a bounding volume size 802 larger than the camera movement magnitude 815 may be indicated as valuable for rendering the frame and as a result its node data request may not be delayed.

In some embodiments, as part of comparing the camera movement magnitude to the bounding volume sizes for any nodes associated with the traversal of the HLOD data structure, the bounding volume sizes of the nodes may be scaled based at least in part on a dot product of the movement direction of the camera and a line from the node to the center of the frame from the camera position. To get a better understanding of what nodes are newly in view, a dot product may be taken with the movement direction and direction to the node bounding volume center. A min/max of all the dot products taken with all the nodes in view may be recorded so that a number between 0 and 1 (or another range e.g., 0-100%) may be determined from the node's dot product and the min/max of all the dot products. For example, a value near 1 may indicate that the node is generally in the direction of movement relative to the camera position, i.e. the node is near an edge of the screen that correlates with the camera movement direction, while a value near 0 may indicate the opposite. The 0-1 value may be used as a weight to penalize or favor a node when the comparison between the node size and the magnitude of movement is made. For example, the 0-1 number may be mapped to a −1 to 1 number. That resulting −1 to 1 number may be multiplied by some fraction of the node's size, such as 0.5. This result may be added to the node size to essentially grow or shrink the node in a range of −50 to 50 percent, thereby penalizing or favoring the node. These ranges of numbers are for example purposes only, and other number ranges and mappings may be used consistent with the various embodiments.

As nodes in an HLOD data structure are generally similar sizes in terms of memory size, keeping a moving average node request latency is a simple measurement of the current network bandwidth. This average node request latency may be used to better inform the decision of whether to ignore a node request. This request latency time may be used to augment the camera movement velocity in the same way the node sizes were temporarily augmented when performing the check to ignore the request. For example, the network latency time may be divided by the frame time to get the network latency factor (number of frames) by which to grow the movement direction. The movement direction may be multiplied by this network latency factor and the result may be used in the comparison with the node size to determine whether the node request should be ignored. As another example, the camera movement magnitude may be scaled by multiplying the camera movement magnitude by the network latency factor to increase the camera movement magnitude used in identifying node that are valuable or not based on their bounding volume sizes.

Figure 9:
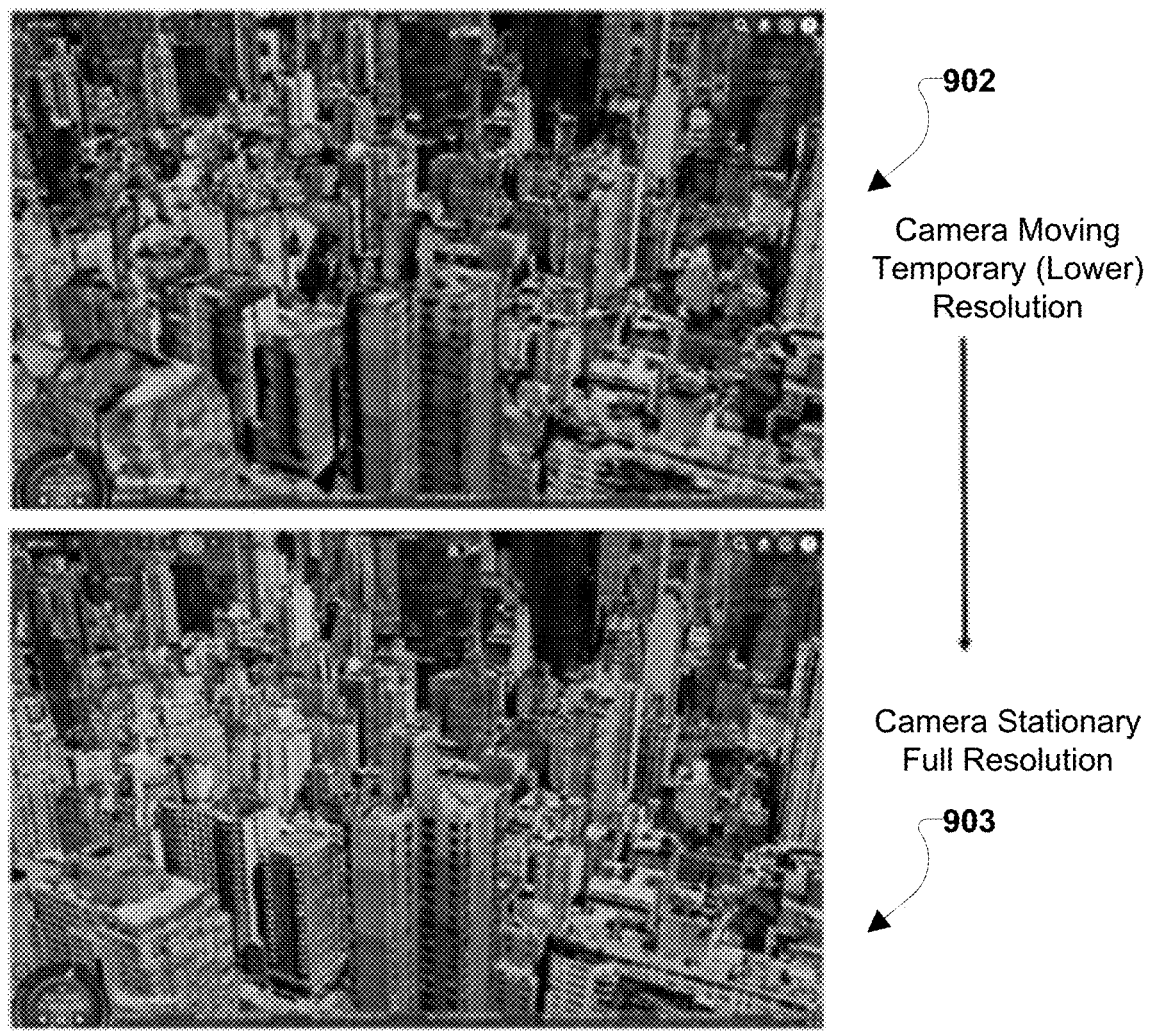
FIG. 9 illustrates a comparison of a temporary resolution view and a full resolution view in a scene from a given camera view.

Another method for determining whether any nodes associated with the traversal are not valuable for rendering the frame may be to adjust the screen resolution during movement. For example, the computing device may select a temporary resolution in response to determining the camera is moving. The temporary resolution may be a lower resolution used when the camera is moving than the resolution used when the camera is stationary. FIG. 9 illustrates a comparison of two such scenes, with a temporary (e.g., lower) resolution view 902 of the scene when the camera is moving and a full resolution view 903 of the same scene when the camera is stationary. The computing device may indicate any nodes associated with the traversal of the HLOD data structure having a screen space error above the temporary maximum screen space error as not valuable for rendering the frame. For example, when the camera is moving, the temporary resolution that is a fraction of the actual screen resolution may be used in the screen space error calculation. Nodes that have more detail than needed for this temporary resolution may be ignored as the nodes are not valuable for rendering the frame. These nodes may still be rendered if they are available client-side at the computing device, but need not be rendered. Different resolutions may be used at different threshold camera speeds and the different temporary resolutions may be tuned to the dataset.

Returning to FIG. 5, in response to determining there are no nodes that are not valuable for rendering the frame (i.e., determination block 512="No"), the computing device may send the node data requests in block 510. Sending the node data requests may include moving the requests to a transmission queue for transmission to a server over a network, such as server 108.

In response to determining that there are nodes that are not valuable for rendering the frame (i.e., determination block 512="Yes"), the computing device may delay node data requests for any nodes associated with the traversal that are not valuable for rendering the frame and may send node data requests for any nodes associated with the traversal that are valuable in block 514. Sending the node data requests for any nodes associated with the traversal that are valuable for rendering the frame may include moving the node data requests to a transmission queue for transmission to a server over a network, such as server 108. Delaying the node data requests for any nodes associated with the traversal that are not valuable for rendering the frame may include moving the requests to a delay queue.

In determination block 516, the computing device may determine whether the camera has stopped moving. In various embodiments, the camera state, such as the camera movement velocity, may be indicate whether or not the camera has stopped moving. For example, a camera movement velocity of zero may indicate the camera is stationary and a camera movement velocity that is non-zero may indicate the camera is moving. As another example, an idle timer exceeding a threshold value may indicate the camera has stopped moving.

In response to determining that the camera has stopped moving (i.e., determination block 516="Yes"), the computing device may send the delayed node data requests in block 518. For example, the computing device may send the delayed node data requests by moving those requests from the delay queue to a transmission queue for transmission to a server over a network, such as server 108.

In response to sending the node data requests in blocks 510 or 518, or in response to determining that the camera is still moving (i.e., determination block 516="No"), the computing device may determine whether any node data requests that have yet to be sent to the server are associated with nodes corresponding to scene portions that are no longer in view (i.e., outside the frame being rendered). For example, the computing device may determine whether any node data requests in a transmission queue are associated with nodes outside the frustum of the camera at its current or estimated future positions.

In response to determining that there are no requests yet to be sent for nodes no longer in view (i.e., determination block 520="No"), the computing device may proceed to block 504 to traverse the HLOD data structure.

In response to determining there are node data requests yet to be sent for nodes corresponding to scene portions that are no longer in view (i.e., determination block 520="Yes"), the computing device may cancel those node data requests in block 522. In this manner, requests for nodes corresponding to scene portions that are not going to be seen may not be sent to the server, thereby conserving network bandwidth for use by other requests. Upon canceling the node data requests, the computing device may continue to traverse the HLOD data structure in block 504.

In various embodiments, the operations of method 500 may be performed continually, such that requests may be delayed, canceled, and sent as the HLOD may be repeatedly traversed, such as on a per-frame basis.

Figure 6:
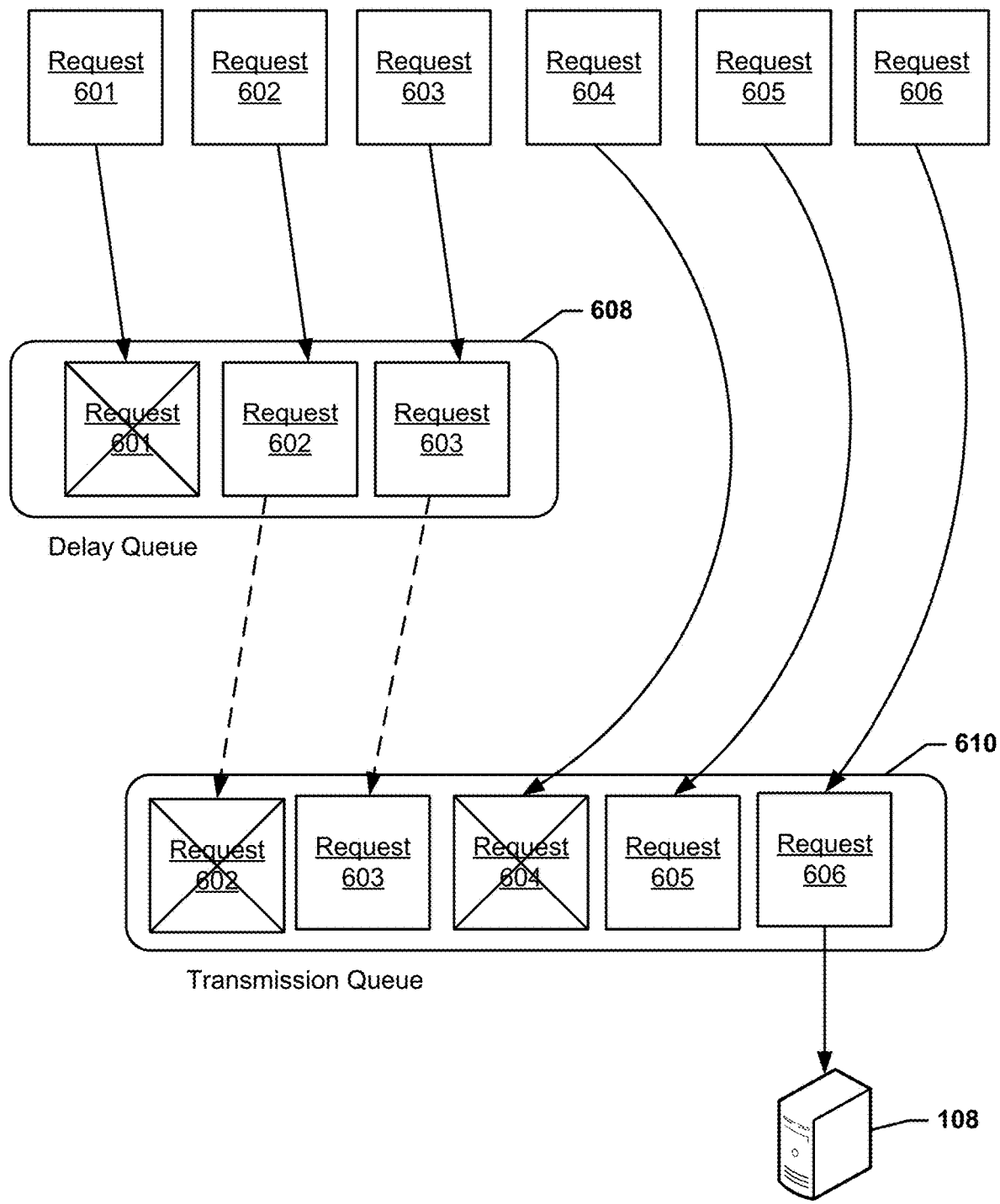
FIG. 6 is a block diagram illustrating example request culling operations.

FIG. 6 illustrates an example of culling requests for nodes according to various embodiments. For example, the operations of method 500 may result in the request culling illustrated in FIG. 6. As illustrated in FIG. 6, a first traversal 600 of the HLOD data structure 300 may result node data requests 601, 602, 603, 604, 605, and 606 being generated. As an example, node data requests 601, 602, and 603 may be determined to be not valuable for rendering the frame and may be delayed by being stored in a delay queue 608 in a memory of the computing device, such as computing device 102. Node data requests 604, 605, and 606 may be determined to be for node data that will be valuable for rendering a frame and may be sent, such as by being stored in a transmission queue 610 from which node data requests may be served to the server 108. Node data requests in the transmission queue 610 may be sent to the server 108 as network capacity becomes available, one a first-in-first out basis, or in any other transmission scheme order. For example, at a given time, node data request 606 may be sent to the server 108 over a network. At some time after being delayed, the computing device may determine that requests 602 and 603 that were not valuable for rendering the frame may be sent. For example, the camera may have stopped moving and what were once not valuable for rendering a frame may now be needed to render the scene. The node data requests 602 and 603 may be moved from the delay queue 608 to the transmission queue 610 to await transmission to the server 108. At some time, the computing device may determine that node data requests 601, 602, and 604 are associated with nodes corresponding to scene portions no longer in view of the camera. In response to determining that the node data requests 601, 602, and 604 are associated with nodes corresponding to scene portions no longer in view of the camera, the node data requests 601, 602, and 604 may be canceled. For example, the node data requests 601, 602, and 604 may be deleted from the delay queue 608 and/or transmission queue 610.

Various examples are discussed herein using various references to HLOD formats and HLOD content being represented as binary trees, etc. These references are used merely as examples to better illustrate aspects of the various embodiments, and are not intended to limit the disclosure or claims in any way. Other HLOD formats, such as other content formats and other tree structures, may be substituted in the various examples without departing from the spirit or scope of the invention.

Figure 10:
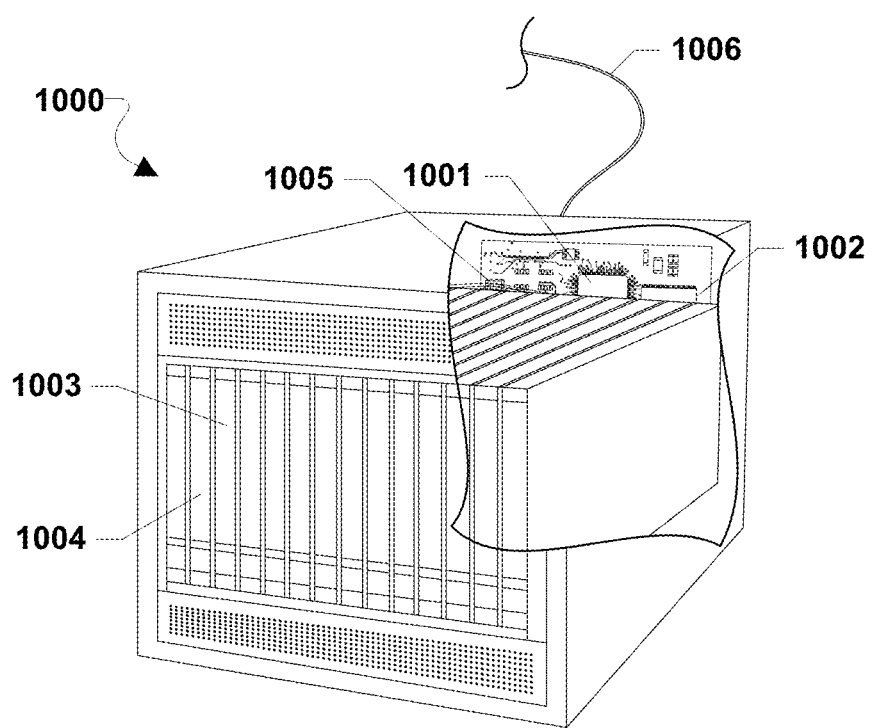
FIG. 10 is a component block diagram of a server that is a computing device suitable for use in the various embodiments.

The various embodiment methods may also be performed partially or completely on a variety of computing devices, such as a server. Such embodiments may be implemented on any of a variety of commercially available server devices, such as the server 1000 illustrated in FIG. 10. Such a server 1000 typically includes a processor 1001 coupled to volatile memory 1002 and a large capacity nonvolatile memory, such as a disk drive 1003. The server 1000 may also include a floppy disc drive, compact disc (CD) or DVD disc drive 1004 coupled to the processor 1001. The server 1000 may also include network access ports 1005 coupled to the processor 1001 for establishing data connections with a network 1006, such as a local area network coupled to other broadcast system computers and servers. The processor 1001 may be any programmable microprocessor, microcomputer or multiple processor chip or chips that may be configured by software instructions (applications) to perform a variety of functions, including the functions of the various embodiments described above. Typically, software applications may be stored in the internal memory 1002, 1003 before they are accessed and loaded into the processor 1001. The processor 1001 may include internal memory sufficient to store the application software instructions.

Figure 11:
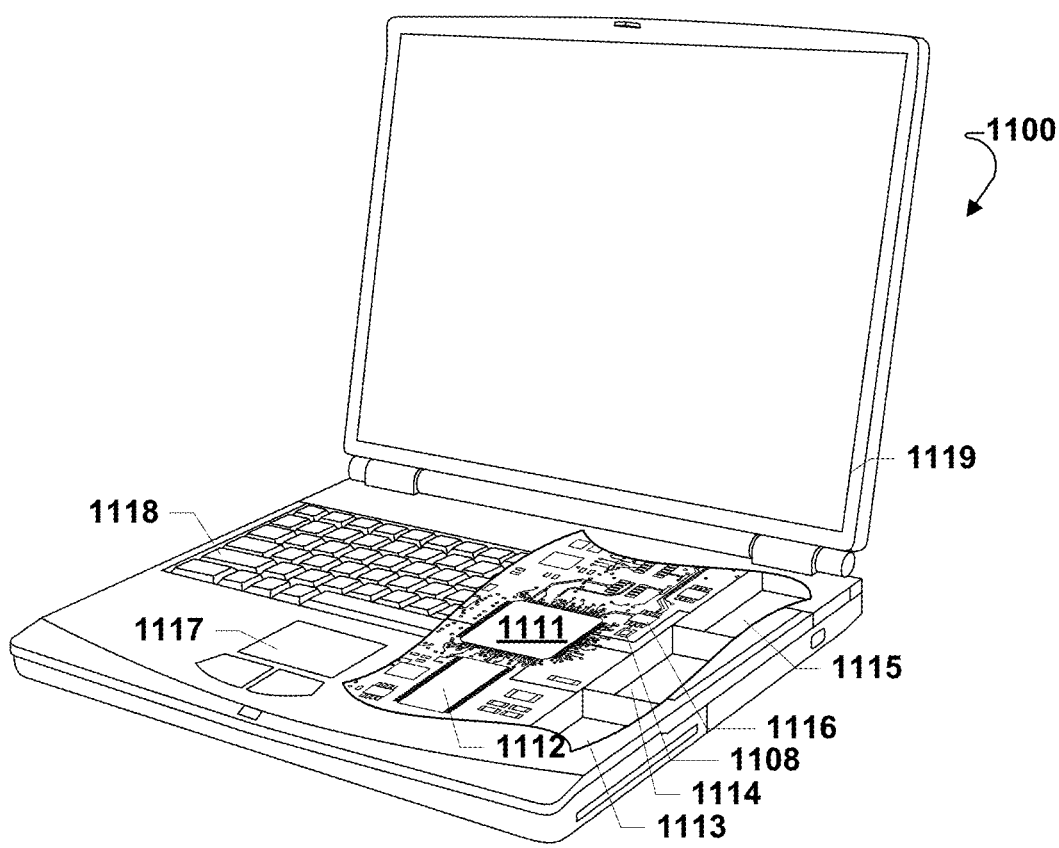
FIG. 11 is a component block diagram of a laptop that is a computing device suitable for use in the various embodiments.

The various embodiments described above may also be implemented within a variety of computing devices, such as a laptop computer 1100 illustrated in FIG. 11. Many laptop computers include a touchpad touch surface 1117 that serves as the computer's pointing device, and thus may receive drag, scroll, and flick gestures similar to those implemented on mobile computing devices equipped with a touch screen display and described above. A laptop computer 1100 will typically include a processor 1111 coupled to volatile memory 1112 and a large capacity nonvolatile memory, such as a disk drive 1113 of Flash memory. Additionally, the computer 1100 may have one or more antennas 1108 for sending and receiving electromagnetic radiation that may be connected to a wireless data link and/or cellular telephone transceiver 1116 coupled to the processor 1111. The computer 1100 may also include a floppy disc drive 1114 and a compact disc (CD) drive 1115 coupled to the processor 1111. In a notebook configuration, the computer housing includes the touchpad 1117, the keyboard 1118, and the display 1119 all coupled to the processor 1111. Other configurations of the mobile computing device may include a computer mouse or trackball coupled to the processor (e.g., via a USB input) as are well known, which may also be used in conjunction with the various embodiments.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps;

these words are simply used to guide the reader through the description of the methods. Further, any reference to claim elements in the singular, for example, using the articles "a," "an" or "the" is not to be construed as limiting the element to the singular.

As used in this application, the terms "component," "module," "system," "engine," "generator," "unit," "manager" and the like are used interchangeably herein and are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general purpose processor, a GPU, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method for culling requests for node data for use in rendering a frame or scene, comprising:
    determining, by a computing device, whether a camera is moving during a frame associated with a traversal of a hierarchical level of detail (HLOD) data structure;
    determining, by the computing device, whether any nodes associated with the traversal of the HLOD data structure are not valuable for rendering the frame in response to determining that the camera is moving, wherein a value of a node for rendering the frame is based at least in part on a latency associated with a network bandwidth;
    delaying, by the computing device, node data requests for any nodes associated with the traversal of the HLOD data structure that are not valuable for rendering the frame;
    determining, by the computing device, whether a request that has not yet been sent to a server is associated with a node corresponding to a portion of the scene no longer in view of the camera; and
    canceling, by the computing device, the request that has not yet been sent to the server in response to determining the request is associated with a node corresponding to a portion of the scene no longer in view of the camera.

2. The method of claim 1, further comprising:
    sending over a network to a server, by the computing device, node data requests for any nodes associated with the traversal of the HLOD data structure that are valuable for rendering the frame.

3. The method of claim 1, wherein determining whether any nodes associated with the traversal of the HLOD data structure are not valuable for rendering the frame in response to determining that the camera is moving comprises:

determining, by the computing device, whether a camera idle timer is below a threshold; and indicating, by the computing device, any nodes associated with the traversal of the HLOD data structure located within a distance of an edge of a screen as not valuable for rendering the frame in response to determining that the camera idle timer is below the threshold.

4. The method of claim 1, wherein determining whether any nodes associated with the traversal of the HLOD data structure are not valuable for rendering the frame in response to determining that the camera is moving comprises:

determining, by the computing device, a camera movement magnitude from a last frame to a current camera position;

comparing, by the computing device, bounding volume sizes for any nodes associated with the traversal of the HLOD data structure to the camera movement magnitude; and indicating, by the computing device, any nodes associated with the traversal of the HLOD data structure having a bounding volume size smaller than the camera movement magnitude as not valuable for rendering the frame.

5. The method of claim 4, wherein the bounding volume sizes are scaled based at least in part on a dot product of a movement direction of the camera and a direction to a node center from the current camera position.

6. The method of claim 5, wherein the latency associated with the network bandwidth is a network latency factor and the camera movement magnitude is scaled based at least in part on the network latency factor.

7. The method of claim 1, wherein determining whether any nodes associated with the traversal of the HLOD data structure are not valuable for rendering the frame in response to determining that the camera is moving comprises:

selecting, by the computing device, a temporary resolution, wherein the temporary resolution is lower than a resolution used when the camera is not moving; and indicating, by the computing device, any nodes associated with the traversal of the HLOD data structure having a screen space error above a temporary maximum screen space error as not valuable for rendering the frame.

8. The method of claim 7, wherein the temporary resolution is selected based at least in part on a camera movement velocity.

9. The method of claim 1, wherein determining whether the camera is moving comprises determining whether a camera movement velocity is a non-zero value.

10. The method of claim 1, further comprising:

determining, by the computing device, whether the camera has stopped moving; and sending, by the computing device, the requests for any nodes associated with the traversal of the HLOD data structure that are not valuable for rendering the frame over a network to a server in response to determining that the camera has stopped moving.

11. A computing device, comprising:
a processor configured to perform operations to:

determine whether a camera is moving during a frame associated with a traversal of a hierarchical level of detail (HLOD) data structure;

determine whether any nodes associated with the traversal of the HLOD data structure are not valuable for rendering the frame in response to determining that the camera is moving, wherein a value of a node for rendering the frame is based at least in part on a latency associated with a network bandwidth;

determine node data requests for any nodes associated with the traversal of the HLOD data structure that are not valuable for rendering the frame;

determine whether a request that has not yet been sent to the server is associated with a node corresponding to a portion of the scene no longer in view of the camera; and cancel the request that has not yet been sent to the server in response to determining the request is associated with a node corresponding to a portion of the scene no longer in view of the camera.

12. The computing device of claim 11, wherein the processor is further configured to:

send over a network to a server node data requests for any nodes associated with the traversal of the HLOD data structure that are valuable for rendering the frame.

13. The computing device of claim 11, wherein the processor is further configured to determine whether any nodes associated with the traversal of the HLOD data structure are not valuable for rendering the frame in response to determining that the camera is moving by:

determining whether a camera idle timer is below a threshold; and indicating any nodes associated with the traversal of the HLOD data structure located within a distance of an edge of a screen as not valuable for rendering the frame in response to determining that the camera idle timer is below the threshold.

14. The computing device of claim 11, wherein the processor is further configured to determine whether any nodes associated with the traversal of the HLOD data structure are not valuable for rendering the frame in response to determining that the camera is moving by:

determining a camera movement magnitude from a last frame to a current camera position;

comparing bounding volume sizes for any nodes associated with the traversal of the HLOD data structure to the camera movement magnitude; and indicating any nodes associated with the traversal of the HLOD data structure having a bounding volume size smaller than the camera movement magnitude as not valuable for rendering the frame.

15. The computing device of claim 14, wherein the bounding volume sizes are scaled based at least in part on a dot product of a movement direction of the camera and a direction to a node center from the current camera position.

16. The computing device of claim 15, wherein the latency associated with the network bandwidth is a network latency factor and the camera movement magnitude is scaled based at least in part on the network latency factor.

17. The computing device of claim 11, wherein the processor is further configured to determine whether any nodes associated with the traversal of the HLOD data structure are not valuable for rendering the frame in response to determining that the camera is moving by:

selecting a temporary resolution, wherein the temporary resolution is lower than a resolution used when the camera is not moving; and indicating any nodes associated with the traversal of the HLOD data structure having a screen space error above a temporary maximum screen space error as not valuable for rendering the frame.

18. The computing device of claim 17, wherein the temporary resolution is selected based at least in part on a camera movement velocity.

19. The computing device of claim 11, wherein the processor is further configured to determine whether the camera is moving by determining whether a camera movement velocity is a non-zero value.

20. The computing device of claim 11, wherein the processor is further configured to:
  determine whether the camera has stopped moving; and
  send the requests for any nodes associated with the traversal of the HLOD data structure that are not valuable for rendering the frame over the network to the server in response to determining that the camera has stopped moving.

21. The computing device of claim 11, wherein the processor is a central processing unit (CPU) or a graphics processing unit (GPU).

22. A non-transitory processor readable medium having stored thereon processor-readable instructions configured to cause a processor to perform operations comprising:
  determining whether a camera is moving during a frame associated with a traversal of a hierarchical level of detail (HLOD) data structure wherein determining whether the camera is moving is based at least in part on determining whether a camera movement velocity is a non-zero value;
  determining whether any nodes associated with the traversal of the HLOD data structure are not valuable for rendering the frame in response to determining that the camera is moving, wherein a value of a node for rendering the frame is based at least in part on a latency associated with a network bandwidth;
  delaying node data requests for any nodes associated with the traversal of the HLOD data structure that are not valuable for rendering the frame;
  sending over a network to a server node data requests for any nodes associated with the traversal of the HLOD data structure that are valuable for rendering the frame;
  determining whether a request that has not yet been sent to the server is associated with a node corresponding to a portion of the scene no longer in view of the camera; and
  canceling the request that has not yet been sent to the server in response to determining the request is associated with a node corresponding to a portion of the scene no longer in view of the camera.

23. The non-transitory processor readable medium of claim 22, wherein the processor-readable instructions are configured to cause a processor of a computing device to perform operations such that determining whether any nodes associated with the traversal of the HLOD data structure are not valuable for rendering the frame in response to determining that the camera is moving comprises:
  determining whether a camera idle timer is below a threshold; and
  indicating any nodes associated with the traversal of the HLOD data structure located within a distance of an edge of a screen as not valuable for rendering the frame in response to determining that the camera idle timer is below the threshold.

24. The non-transitory processor readable medium of claim 22, wherein the processor-readable instructions are configured to cause a processor of a computing device to perform operations such that determining whether any nodes associated with the traversal of the HLOD data structure are not valuable for rendering the frame in response to determining that the camera is moving comprises:
  determining a camera movement magnitude from a last frame to a current camera position;
  comparing bounding volume sizes for any nodes associated with the traversal of the HLOD data structure to the camera movement magnitude; and
  indicating any nodes associated with the traversal of the HLOD data structure having a bounding volume size smaller than the camera movement magnitude as not valuable for rendering the frame; and
  wherein the processor-readable instructions are configured to cause a processor of a computing device to perform operations such that:
    the bounding volume sizes are scaled based at least in part on a dot product of a movement direction of the camera and a direction to a node center from the current camera position;
    the latency associated with the network bandwidth is a network latency factor; and
    the camera movement magnitude is scaled based at least in part on the network latency factor.

25. The non-transitory processor readable medium of claim 22, wherein the processor-readable instructions are configured to cause a processor of a computing device to perform operations such that determining whether any nodes associated with the traversal of the HLOD data structure are not valuable for rendering the frame in response to determining that the camera is moving comprises:
  selecting a temporary resolution, wherein the temporary resolution is lower than a resolution used when the camera is not moving; and
  indicating any nodes associated with the traversal of the HLOD data structure having a screen space error above a temporary maximum screen space error as not valuable for rendering the frame.

26. The non-transitory processor readable medium of claim 22, wherein the processor-readable instructions are configured to cause a processor of a computing device to perform operations further comprising:
  determining whether the camera has stopped moving; and
  sending the requests for any nodes associated with the traversal of the HLOD data structure that are not valuable for rendering the frame over the network to the server in response to determining that the camera has stopped moving.

* * * * *